(12) United States Patent
Oh

(10) Patent No.: US 8,796,979 B2
(45) Date of Patent: Aug. 5, 2014

(54) APPARATUS FOR DRIVING BRUSHLESS DC MOTOR

(71) Applicant: Electronics and Telecommunications Research Institute, Daejeon (KR)

(72) Inventor: Jimin Oh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 154 days.

(21) Appl. No.: 13/672,764

(22) Filed: Nov. 9, 2012

(65) Prior Publication Data

US 2013/0200832 A1 Aug. 8, 2013

(30) Foreign Application Priority Data

Feb. 3, 2012 (KR) .......................... 10-2012-0011221

(51) Int. Cl.
G05B 11/28 (2006.01)
H02P 6/00 (2006.01)

(52) U.S. Cl.
CPC ........................................ *H02P 6/00* (2013.01)
USPC ................. 318/599; 318/400.01; 318/400.14; 318/721; 318/779; 318/799; 318/811; 318/437; 324/256

(58) Field of Classification Search
CPC .................................. H02P 27/06; H02P 27/08
USPC ............. 318/400.01, 400.02, 400.07, 400.14, 318/400.15, 400.42, 599, 721, 779, 799, 318/801, 811, 823, 268; 324/256
See application file for complete search history.

(56) References Cited

U.S. PATENT DOCUMENTS

| 5,541,488 A | * | 7/1996 | Bansal et al. ................. 318/801 |
| 7,262,578 B2 | * | 8/2007 | Iotti ......................... 318/400.04 |
| 2008/0084139 A1 | | 4/2008 | Schroer et al. |
| 2011/0175560 A1 | | 7/2011 | Akiyama |
| 2011/0175561 A1 | | 7/2011 | Kakiuchi et al. |

FOREIGN PATENT DOCUMENTS

| JP | 07-123773 A | 5/1995 |
| JP | 2009-171718 A | 7/2009 |

* cited by examiner

*Primary Examiner* — Antony M Paul
(74) *Attorney, Agent, or Firm* — Rabin & Berdo, P.C.

(57) ABSTRACT

Disclosed is an apparatus for driving a BLDC motor, the apparatus including: a BLDC motor having a single sensing coil therein; a position/speed calculation unit for calculating a current position and a current speed of a rotor by using voltages at both ends of the sensing coil; a control unit for comparing the current speed of the rotor calculated by the position/speed calculation unit with a command speed and then outputting a control signal through a Proportional Integral (PI) control; a motor driving unit for generating a PWM signal based on the current position of the rotor calculated by the position/speed calculation unit and the control signal output by the control unit; and a power device unit for controlling the BLDC motor according to the PWM signal generated by the motor driving unit.

8 Claims, 4 Drawing Sheets

APPARATUS FOR DRIVING BRUSHLESS DC MOTOR

CROSS-REFERENCE TO RELATED APPLICATIONS

This application is based on and claims priority from Korean Patent Application No. 10-2012-0011221, filed on Feb. 3, 2012, with the Korean Intellectual Property Office, the disclosure of which is incorporated herein in its entirety by reference.

TECHNICAL FIELD

The present disclosure relates to an apparatus for driving a Brushless DC (BLDC) motor, and more particularly, to an apparatus for driving a BLDC motor which does not require an expensive hall sensor and a complex sensor circuit by installing one sensing coil within the BLDC motor and directly measuring a position of a rotating rotor.

BACKGROUND

A Brushless DC (BLDC) motor refers to an apparatus for converting electrical energy to mechanical energy unlike a DC motor in the related art. While the DC motor in the related art operates with a brush corresponding to a temporary device having high abrasivity and a commutator (mechanical switching), the BLDC motor attracts attention as an apparatus for transferring and converting energy with high efficiency by using a semi-permanent power device (electrical switching) such as a high capability Insulated Gate Bipolar Transistor (IGBT) and a MOSFET. Due to such a reason, the BLDC motor is used throughout various industries relevant to an automobile and an industrial robot, and is expected to be continuously used in the future.

Electrical energy is transferred to the BLDC motor through an energy converter which is a driving apparatus. In general, the driving apparatus of the BLDC motor includes a power device (IGBT and MOSFET), a power device driving circuit (or gate-driver) and a motor driving circuit (or motor control unit). The power device serves to transfer a DC voltage to be supplied to the BLDC motor, and on-resistance, a breakdown voltage and a switching frequency are considered as being important in the power device. The power device driving circuit serves to turn on/off a power device gate so that the above-mentioned power device supplies DC power to the BLDC motor at a proper timing. Further, the power device driving circuit includes an over-current protection circuit for turning off the power device gate when a current flowing in the power device is equal to or larger than a reference current and a temperature protection circuit for blocking an operation of the power device gate when a temperature is equal to or higher than a reference temperature due to heat generated during a process of turning on/off the power device gate. Finally, the motor driving circuit includes a control block, a PWM generating block and a position estimating block. The control block is in a PI control form in order to reduce a difference of a control signal generated due to a difference between a command speed and a current speed, and should be optimized for effects such as responsibility improvement of the control unit and overshoot reduction. The PWM generating block is required for reflecting an output value of the control block to the power device driving circuit. In general, the output value of the control block is a voltage value or a current value reflecting capability of the control unit. The PWM generating block generates a signal in a PWM form to allow such values to be applied to the power device driving circuit. The position estimating block estimates a position of the rotor within the BLDC motor to determine a speed and the position of the current rotor, and generates a rotation signal of a next BLDC motor based on the determined speed and position. An optimized circuit design and algorithm of the above-mentioned blocks may influence the capability of the driving apparatus of the BLDC motor, but it is more important to understand how a mechanical system and an electrical system interwork with each other and to accurately detect the position of the rotor so that an electrical signal required for the mechanical system can be generated based on a movement of the rotor corresponding to an action of the mechanical system, which is properly transferred to the driving apparatus of the BLDC motor of the electrical system.

Prior document 1 (D fascicle of The Institute of Electrical Engineers of Japan, Vol. 107D, No. 5, pp. 628-634, 1987-5, Japan) discloses a method using a plurality of sensing coils to detect a movement of the rotor. An author of prior document 1 uses the plurality of sensing coils (eights coils) to spatially and temporally detect a variation in a magnetic field by considering a fundamental cause of generation of a rotation of the motor as spatial and temporal variations in the magnetic field of the rotor. Accordingly, the author describes that it is advantageous to detect the movement of the rotor in a transient state when there is a rapid change in loads. The prior document 1 includes the intention of making a motor operation technique more accurate by monitoring the variation in the magnetic field within the motor due to a hermeneutical technology and a methodological approach between the eight sensing coils. However, in prior document 1, it may be difficult to achieve mass production of the motor because of the complexity due to the use of the plurality of sensing coils, and there is a disadvantage in that a calculation unit for processing information on the plurality of sensing coils should be separately added to the motor driving apparatus. Further, prior document 1 has complexity in a system since each sensing coil has back electromotive force generated by the magnetic field of the rotor and thus a coupling effect generated between respective sensing coils also should be considered.

Prior patent 1 (US 2008/0084139 A1) discloses a method of installing a hall sensor in the outside of the motor to detect a position of the rotor through a sensing circuit. The motor is currently used in many industrial areas, and the method is one of several methods widely used in such industrial areas. The hall sensor detects a movement of electrons within the hall sensor changed according to a variation in a magnetic field by detecting a spatial variation of the magnetic field generated by a movement of the rotor. The hall sensor refers to a sensor using a "hall effect" in physics. In general, the hall sensor is frequently used in a servo motor system requiring an accurate movement rather than a cost reduction since the hall sensor has excellent performance but is expensive. Further, the hall sensor has a spatial limitation in that the hall sensor should be installed in the outside of the motor.

Prior patent 2 (US 2011/0175560 A1) discloses a method of indirectly estimating a position of the rotor by transferring voltage and current signals applied to the motor to various operation blocks within the motor driving circuit through a external current sensor interface. In prior patent 2, the operation block is inserted in the inside of the motor driving circuit in order to overcome spatial characteristics of prior patent 1 in which the hall sensor should be installed in the outside of the motor, and thus a position of the motor may be estimated without adding separate equipment to the motor. That is, prior patent 2 pays attention to the fact that a current applied to the motor is changed by the movement of the rotor and uses the current for estimating the position of the rotor. This means that a coil for driving the motor detects the spatial variation in the magnetic field by the movement of the rotor and a change in a current amount and a current direction by the detected signal is compensated for in a circuit, so that the position of the rotor is indirectly estimated. However, prior patent 2 requires various types of operation blocks for replacing a position estimating block of the rotor in the motor driving circuit such as a correction circuit due to a difference between interfaces for the voltage and the current of the motor driving circuit and an analog/digital circuit for a complex arithmetic operation by the current and the voltage and for implementing the arithmetic operation. For example, since a current waveform includes both a signal for driving the motor and a signal by the movement of the rotor, there is a need for a filter for separating the signals.

Prior patent 3 (US 2011/0175561 A1) discloses a method of estimating the position of the rotor using a structurally simple external single sensing coil unlike the hall sensor/position estimating circuit in a sensor/sensorless type in the related art. At this time, the external single sensing coil can be installed in a desired position and then used because the external single sensing coil is attachable and removable. However, in prior patent 3, the single sensing coil is arranged in the outside of the motor, so that a vibration of the motor may change a movement of the external single sensing coil. This corresponds to a fact that interruption must occur to estimate an accurate position of the rotor using the external sensing coil. In addition, measurement sensitivity of the external sensing coil may be influenced by a protection film in an outer cover type surrounding the motor.

SUMMARY

The present disclosure has been made in an effort to solve the above-mentioned problems and provide an apparatus for driving a BLDC motor which does not require an expensive hall sensor or a complex sensing circuit.

An exemplary embodiment of the present disclosure provides an apparatus for driving a BLDC motor, the apparatus including: a BLDC motor having a single sensing coil therein; a position/speed calculation unit for calculating a current position and a current speed of a rotor by using voltages at both ends of the sensing coil; a control unit for comparing the current speed of the rotor calculated by the position/speed calculation unit with a command speed and then outputting a control signal through a Proportional Integral (PI) control; a motor driving unit for generating a PWM signal based on the current position of the rotor calculated by the position/speed calculation unit and the control signal output by the control unit; and a power device unit for controlling the BLDC motor according to the PWM signal generated by the motor driving unit.

According to the exemplary embodiments of the present disclosure, it is possible to achieve economical efficiency and convenience without an expensive hall sensor or a complex sensing circuit by providing an apparatus for driving a BLDC motor which directly measures a position and a speed of a rotor by using a sensing coil within the BLDC motor.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, exemplary embodiments of the present disclosure will be described in detail with reference to the accompanying drawings. Further, in a description of the present disclosure, a detailed description of related known configurations and functions will be omitted when it may make the essence of the present disclosure obscure.

Figure 1:
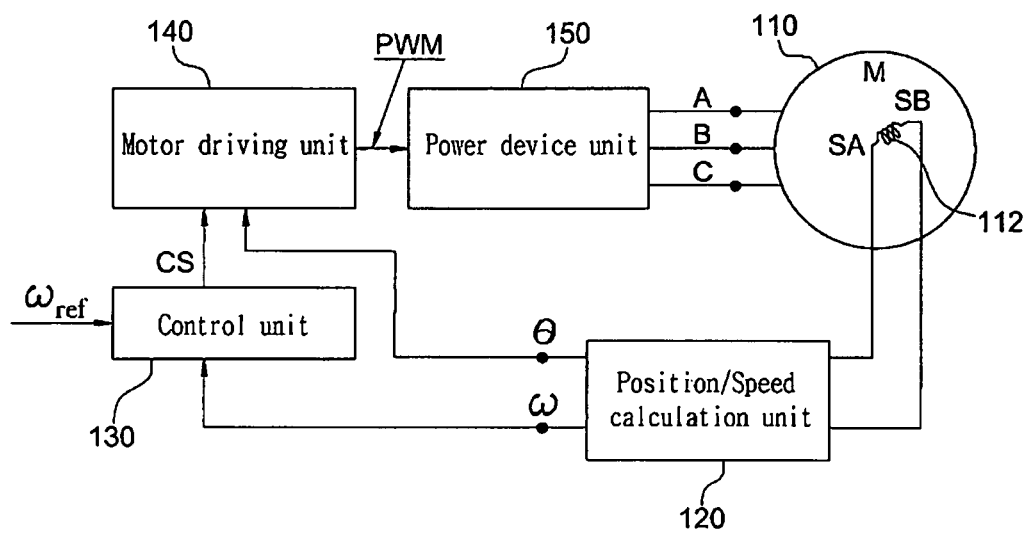
FIG. 1 is a view schematically illustrating a configuration of an apparatus for driving a BLDC motor according to an exemplary embodiment of the present disclosure.

FIG. 1 is a view schematically illustrating a configuration of an apparatus for driving a BLDC motor according to an exemplary embodiment of the present disclosure.

Referring to FIG. 1, an apparatus for driving a BLDC motor according to the present disclosure includes a BLDC motor 110, a position/speed calculation unit 120, a control unit 130, a motor driving unit 140 and a power device unit 150.

The BLDC motor 110 includes a single sensing coil 112 therein. According to the present disclosure, a current position and a current speed of a rotor are calculated using voltages at both ends of the sensing coil 112. A detailed configuration of the BLDC motor 110 according to the present disclosure will be described with reference to FIG. 2.

The position/speed calculation unit 120 is a block for receiving voltages at both ends of the sensing coil 112 existing within the BLDC motor 110 to operate a current position θ and a current speed ω of the rotor. The position/speed calculation unit 120 is the most important element of the apparatus for driving the BLDC motor according to the present disclosure, and an important block influencing an action of the motor driving unit 140. A detailed configuration of the position/speed calculation unit 120 according to the present disclosure will be described with reference to FIG. 3.

The control unit 130 compares the current speed ω of the rotor calculated by the position/speed calculation unit 120 with a command speed, and then outputs a control signal CS through a Proportional Integral (PI) control by a speed difference between the current speed ω of the rotor and the command speed. That is, the control unit 130 allows the current speed to reach the command speed in a short time through a proportional control of multiplying the speed difference and a proportional constant $K_I$ and an integral control of multiplying a proportional constant $K_P$ and an accumulated speed difference for a time.

The motor driving unit 140 can generate an accurate PWM signal only when the motor driving unit 140 knows a current position of the BLDC motor 110, and should be able to determine whether to drive the BLDC motor 110 at a faster speed or a slower speed than the current speed through a proper control signal.

To this end, the motor driving unit 140 generates three-phase PWM signals based on the control signal CS output from the control unit 130 and the current position of the rotor, that is, angle information θ. Here, the PWM signal has a Sinusoidal PWM (SPWM) type because it is well known that the SPWM is more effective to reduce noise and torque ripple generated in the motor in comparison with other PWM techniques. To this end, the SPWM compares a sine wave of a predetermined frequency and a triangular wave having a frequency corresponding to ten times or larger of the frequency of the sine wave.

The power device unit 150 includes a power device driving unit (or a gate driver) and a power device (or power semiconductor).

The power device driving unit receives the PWM signal from the motor driving unit 140. And the power device driving unit generates three-phase gate signals GA, GB and GC by using the PWM signal to drive the power device. Here, a voltage level of the PWM signal and a voltage level of the gate signal may vary depending on a type of power device. For example, the PWM signal usually has 5 V or 3.3 V, and the gate signal usually has 10 V to 30 V.

The power device may be an Insulated Gate Bipolar Transistor (IGBT) or a MOSFET. When the power device is in a three-phase while two devices make one pair, a total of six devices may be used. The three-phase gate signals GA, GB and GC of the power device driving unit are used for driving the three-phase power devices. That is, two gate signals are complementarily formed in a top side and a bottom side of one gate signal, and accordingly a voltage connected to a top gate and a voltage connected to a bottom gate are supplied to the BLDC motor 110.

Figure 2:
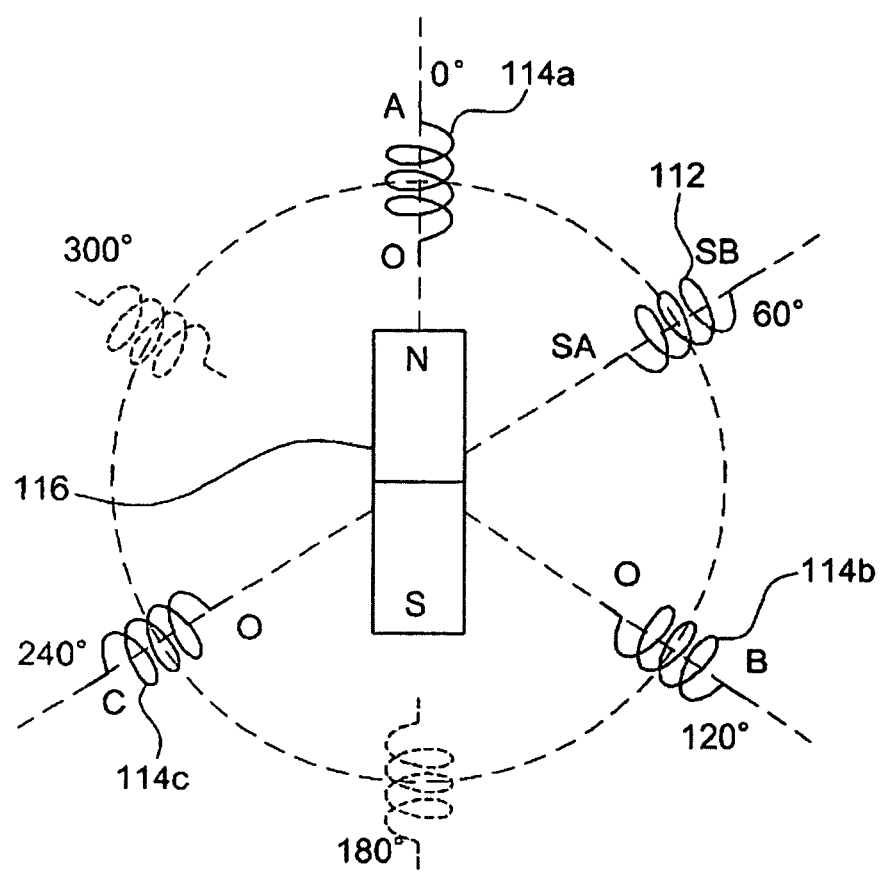
FIG. 2 is a view illustrating a structure of a BLDC motor according to an exemplary embodiment of the present disclosure.

FIG. 2 is a view illustrating a structure of the BLDC motor according to an exemplary embodiment of the present disclosure.

A conventional BLDC motor receives a driving signal required for driving the motor through lines A, B and C. A high voltage and a lot of currents flow in the lines A, B and C according to the gate signal, and back electromotive force is generated according to a rotation of the rotor within the motor to cause an alteration in the driving signal. Although the motor driving unit generates a driving signal for suppressing the generation of the noise and torque ripple, the alteration in the driving signal is generated by a rotation of the motor. Accordingly, the driving signal should be generated by considering the alteration, but there is a limitation due to an interaction between an electrical system and a mechanical system. Therefore, it seems difficult to overcome the limitation without a fundamental change in the structure of the motor.

Further, in the related art, the driving signal of the motor driving unit is sensed and back electromotive force existing within the sensed signal is extracted to prevent the alteration in the driving signal. In such a method, when the driving signal becomes large, the sensing signal becomes small, and thus it is difficult to extract the sensing signal. When the driving signal becomes small and the sensing signal becomes large, driving performance of the motor is deteriorated. This is generated since both the driving signal and the sensing signal are within one signal, so it is required to separate the driving signal from the sensing signal.

To this end, the BLDC motor 110 according to the present disclosure includes the single sensing coil 112 and three-phase driving coils 114a, 114b and 114c as shown in FIG. 2.

The three-phase driving coils 114a, 114b and 114c are arranged in a distributed coil type, and the distributed coils having maximum turns are arranged at 0 degrees, 120 degrees and 240 degrees, respectively, for a balance between the three-phase driving coils 114a, 114b and 114c. It is because to make the BLDC motor 110 naturally drive and reduce an effect of mutual inductance generated by the driving of each driving coil.

Further, in order to minimize an influence on the driving coils 114a, 114b and 114c by the sensing coil 112, it is desirable that the number of turns of the driving coils 114a, 114b and 114c is ten times or larger of the number of turns of the sensing coil 112.

The sensing coil 112 is disposed at one of 60 degrees, 180 degrees and 300 degrees.

Figure 3:
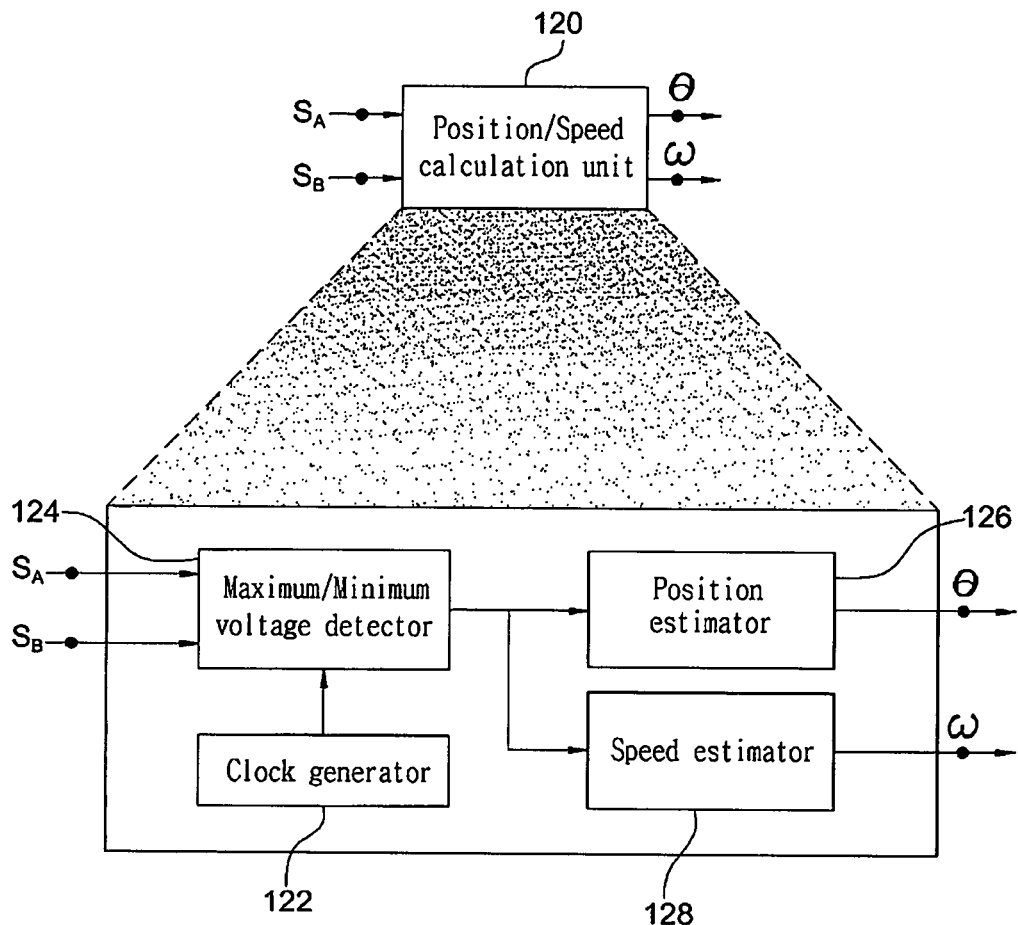
FIG. 3 is a view illustrating a configuration of a position/speed calculation unit according to an exemplary embodiment of the present disclosure.

FIG. 3 is a view illustrating a configuration of a position/speed calculation unit according to an exemplary embodiment of the present disclosure.

Referring to FIG. 3, the position/speed calculation unit 120 according to the present disclosure includes a clock generator 122, a maximum/minimum voltage detector 124, a position estimator 126 and a speed estimator 128.

The clock generator 122 generates a clock signal of 100 kHz. Here, a frequency of the clock signal may be increased for accuracy of an estimated position and speed.

The maximum/minimum voltage detector 124 includes an A/D converter therein to convert an analog signal to a digital signal.

The maximum/minimum voltage detector 124 stores the number of clocks when a maximum value or a minimum value of both voltages of the sensing coil 112 is generated based on the clock signal generated by the clock generator 122. At this time, the clock signal is based on an N polar of the rotor 116 at 0 degrees, and the maximum/minimum voltage detector 124 may further include a block for correcting the clock signal.

Meanwhile, in a case where the sensing coil is disposed at 60 degrees, when the voltages at both ends of the sensing coil 112 have a maximum value, the N polar of the rotor 116 is located at 240 degrees, and other positions of the rotor 116 may be defined using a primary linear approximation method. The position estimator 126 estimates the current position θ of the rotor 116 according to the voltages at both ends of the sensing coil 112 based on the position of the sensing coil 112 by using such a method.

The speed estimator 128 compares the number of clocks when the voltages at both ends of the sensing coil 112 have the maximum value and the number of clocks when the voltages at both ends of the sensing coil 112 have the minimum value, and then applies a difference value to a speed operation to estimate the current speed w of the rotor 116. A detailed description of the estimation of the current speed will be made with reference to FIG. 5.

Figure 4A:
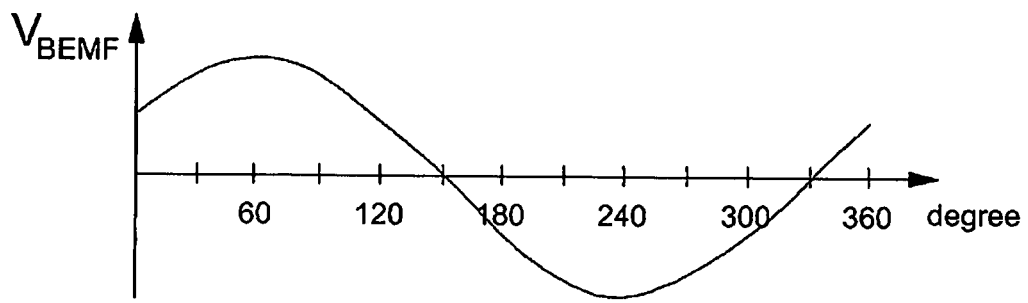
FIGS. 4A and 4B are graphs illustrating voltages at both ends of a sensing coil when the sensing coil is disposed at 60 degrees according to an exemplary embodiment of the present disclosure.
Figure 4B:
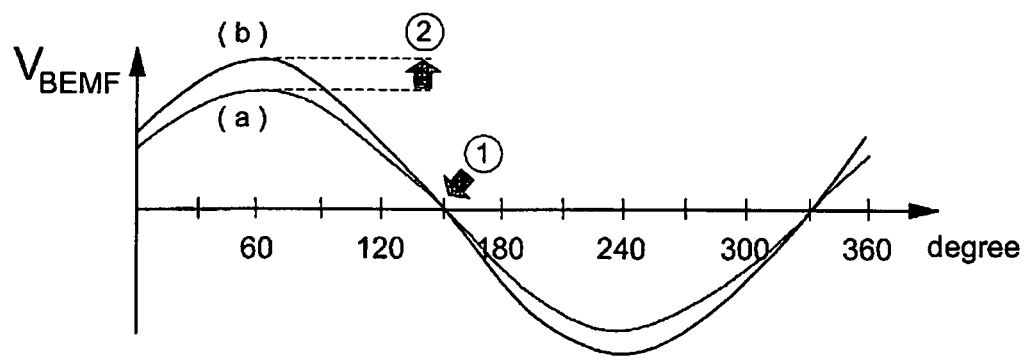

FIGS. 4A and 4B are graphs illustrating voltages at both ends of the sensing coil when the sensing coil is disposed at 60 degrees according to an exemplary embodiment of the present disclosure.

Referring to FIG. 4A, the voltages at both ends of the sensing coil 112 have the maximum value when the N polar of the rotor 116 is closest to the sensing coil 112. Accordingly, when the N polar of the rotor 116 is located at 60 degrees, the voltages at both ends of the sensing coil 112 become maximum. Further, when the rotor 116 rotates once, a signal in a sine wave type is detected in the sensing coil 112. That is, in a case where the voltages at both ends of the sensing coil 112 are maximum, when comparison and control operations of the position/speed calculation unit 120 are performed based on the position of the sensing coil 112, the position of the N polar of the rotor 116, that is, a current position of the rotor 116 may be accurately detected.

Referring to FIG. 4B, the voltages at both ends of the sensing coil 112 generated at a reference speed are (a), and the voltages at both ends of the sensing coil 112 at a faster speed than the reference speed are (b). If the position of the sensing coil 112 is not changed although a speed of the motor is changed in (a) and (b), it can be identified that time points when the voltages at both ends of the sensing coil 1125 become "0" are the same as ①. This means that back electromotive force generated in the sensing coil 112 becomes "0", and at this time, an inner product becomes "0" as a direction of the sensing coil 112 and a direction of a magnetic field of the N polar become 90 degrees. That is, it can be identified that the voltages at both ends of the sensing coil 112 become "0" in the same position regardless of a low-speed movement or a high-speed movement of the motor.

Further, as the speed of the motor becomes faster like in ②, the maximum value of the voltages at both ends of the sensing coil 112 is changed. The maximum value of the voltages at both ends of the sensing coil 112 is slowly changed at a low speed (approximately 500 rpm or less) and a high speed (approximately 4000 rpm or more), and is noticeably changed between the low speed and the high speed. That is, the maximum value at both ends of the sensing coil 112 is proportional to the speed.

Figure 5:
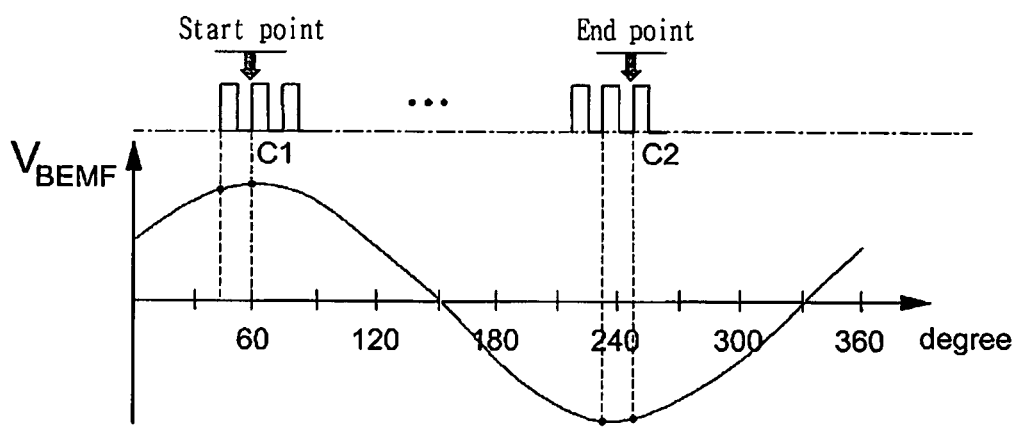
FIG. 5 is a view for describing a method of estimating a speed by a position/speed calculation unit according to an exemplary embodiment of the present disclosure.

FIG. 5 is a view for describing a method of estimating a speed by the position/speed calculation unit according to an exemplary embodiment of the present disclosure.

As shown in FIG. 5, when the voltages at both ends of the sensing coil 112 are changed from the maximum value to the minimum value, the N polar of the rotor 116 rotates 180 degrees.

If a clock frequency is f Hz/clk, the number of clocks is C1 when the voltages at both ends of the sensing coil 112 have the maximum value, and the number of clocks is C2 when the voltage at both ends of the sensing coil 112 have the minimum value, a difference between the number of clocks when the voltages at both ends have the maximum value and the number of clocks when the voltages at both ends have the minimum value is CC=|C2−C1|, so that the current speed ω may be easily estimated by an equation of 180 degrees/(CC*f).

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An apparatus for driving a BLDC motor, the apparatus comprising:
   a BLDC motor having a single sensing coil therein;
   a position/speed calculation unit for calculating a current position and a current speed of a rotor by using voltages at both ends of the sensing coil;
   a control unit for comparing the current speed of the rotor calculated by the position/speed calculation unit with a command speed and then outputting a control signal through a Proportional Integral (PI) control;
   a motor driving unit for generating a PWM signal based on the current position of the rotor calculated by the position/speed calculation unit and the control signal output by the control unit; and
   a power device unit for controlling the BLDC motor according to the PWM signal generated by the motor driving unit.

2. The apparatus of claim 1, wherein the BLDC motor comprises three driving coils disposed in a distributed coil type.

3. The apparatus of claim 2, wherein a number of turns of each driving coil is ten times or larger of a number of turns of the sensing coil.

4. The apparatus of claim 2, wherein the three driving coils are disposed at 0 degrees, 120 degrees and 240 degrees, respectively.

5. The apparatus of claim 4, wherein the sensing coil is disposed at one of 60 degrees, 180 degrees and 300 degrees.

6. The apparatus of claim 1, wherein the PWM signal is in a Sinusoidal PWM (SPWM) type.

7. The apparatus of claim 1, wherein the power device unit comprises:
   a power device driving unit for generating a gate signal according to the PWM signal generated by the motor driving unit; and
   a power device for outputting a driving signal for driving the BLDC motor according to the gate signal generated by the power device driving unit.

8. The apparatus of claim 1, wherein the position/speed calculation unit comprises:
   a clock generator for generating a clock signal;
   a maximum/minimum voltage detector for storing a number of clocks when a maximum value or a minimum value of the voltages at the both ends of the sensing coil is generated based on the clock signal generated by the clock generator;
   a position estimator for estimating the current position of the rotor according to the voltages at the both ends of the sensing coil based on a position of the sensing coil; and
   a speed estimator for comparing a number of clocks when the voltages at the both ends of the sensing coil have a maximum value with a number of clocks when the voltages at the both ends of the sensing coil have a minimum value and then applying a difference value to a speed operation to estimate the current speed of the rotor.

* * * * *